United States Patent
Merkle et al.

[15] 3,703,221
[45] Nov. 21, 1972

[54] LUBRICATION DEVICE FOR ROTATING MACHINE PARTS

[72] Inventors: Alfred Merkle; Volker Schlicker, both of St. Georgen; Günter Wrobel, Villingen, all of Germany

[73] Assignee: Papst-Motoren KG, St. Georgen, Germany

[22] Filed: Dec. 24, 1970

[21] Appl. No.: 101,226

[30] Foreign Application Priority Data

Dec. 24, 1969    Germany..........P 19 64 889.6

[52] U.S. Cl. ...............184/6.27, 277/133, 308/187.1
[51] Int. Cl..............................................F16n 31/02
[58] Field of Search..............184/6.16, 6 R, 10, 6.27; 308/187.1; 277/67, 133

[56] References Cited

UNITED STATES PATENTS

| | | | |
|---|---|---|---|
| 988,138 | 3/1911 | Penny et al. | 277/133 X |
| R17,322 | 6/1929 | Eveno | 277/133 X |
| 2,000,581 | 5/1935 | Coffin, Jr. et al. | 277/133 X |
| 2,188,856 | 1/1940 | Chievitz | 277/133 |
| 2,590,422 | 3/1952 | Large | 277/133 X |

FOREIGN PATENTS OR APPLICATIONS 1,085,330    9/1967    Great Britain

OTHER PUBLICATIONS

Lubricant Slinger (Abstract), filed 3/1/47, by L. W. Wightman, published 12/5/50.

*Primary Examiner*—Manuel A. Antonakas
*Attorney*—Flynn & Frishauf

[57] ABSTRACT

Lubrication device for lubricating a rotating machine part wherein a rotatable centrifuging ring is provided for centrifuging lubricants escaping along the rotating part back toward an absorbent body which is in liquid communication with a lubricant reservoir, thus passing escaping lubricant back to the lubricant reservoir.

26 Claims, 5 Drawing Figures

INVENTORS.
Alfred MERKLE; Volker SCHLICKER
Günter WROBEL
BY
FLYNN & FRISHAUF
ATTORNEYS

LUBRICATION DEVICE FOR ROTATING MACHINE PARTS The present invention relates to a lubrication device for the lubrication of a bearing of a machine, and more particularly to such a device suitable for the lubrication of bearings in electric motors or any other types of rotating machines.

It is a requirement in the use of many electrical machines that they should have a truly long life span. This is for example the case with electrical motors which are built into ventilating systems. If these ventilators are in continuous operation, as is for example the case with ventilators for electronic instruments, then the lubricant that is put in during manufacture must be good for an exceptionally great number of operating hours. That is, the amount of this lubricant that is put in during manufacture that subsequently gets lost in use must be kept to an absolute minimum. The difficulty of this problem is often increased even further by the fact that such motors are very small and therefore there is little available space for complicated lubrication devices. Also, such motors are often operated at a rather high operating temperature, whereby the lubricant becomes very thin and watery, while on the other hand one is forced to utilize an improved insulation, for example insulation class F, with the result that the already limited space within the motor is further reduced by the added insulating material.

Furthermore, it has been demonstrated that during the installation of electric motors in electronic devices, for example in ventilators for the cooling of these devices, a loss of lubricant can be very serious if the lubricant is silicon based, because even tiny traces of silicon oil can for example greatly disturb the switching functions of electrical contacts in such a device. Therefore, when such silicon lubricants are utilized, their leakage from a motor must be kept as low as possible.

It is therefore an object of the present invention to provide a lubrication device which permits the maintenance of a limited amount of lubricant within a given area for a long period of time.

Another object of the invention is to provide a lubrication device which is suitable for installation in very small electric motors.

A further object of the invention is to provide a lubrication device for an electric motor whose bearings are lubricated with silicon-based lubricants and in which lubricant loss even after very long use is kept low.

A still further object of the invention is to provide a lubrication device for a bearing of a motor of the external rotor type.

A yet further object of the invention is to provide a lubrication device which is made up of inexpensive components and which can be mounted with low costs.

SUMMARY OF THE INVENTION

In accordance with the present invention a lubrication device for the lubrication of a bearing of a rotating machine part comprises a lubricant reservoir for retaining a supply of lubricant, a rotatable centrifuging ring for centrifuging lubricants escaping along the rotating part, and an absorbent body in liquid communication with the lubricant reservoir for receiving the centrifuged lubricant from the centrifuging ring and for passing same back to the lubricant reservoir.

DRAWINGS

In the following description of FIG. 1 the concepts "right" and "left" refer to the pictorial representation in FIG. 1.

Figure 1:
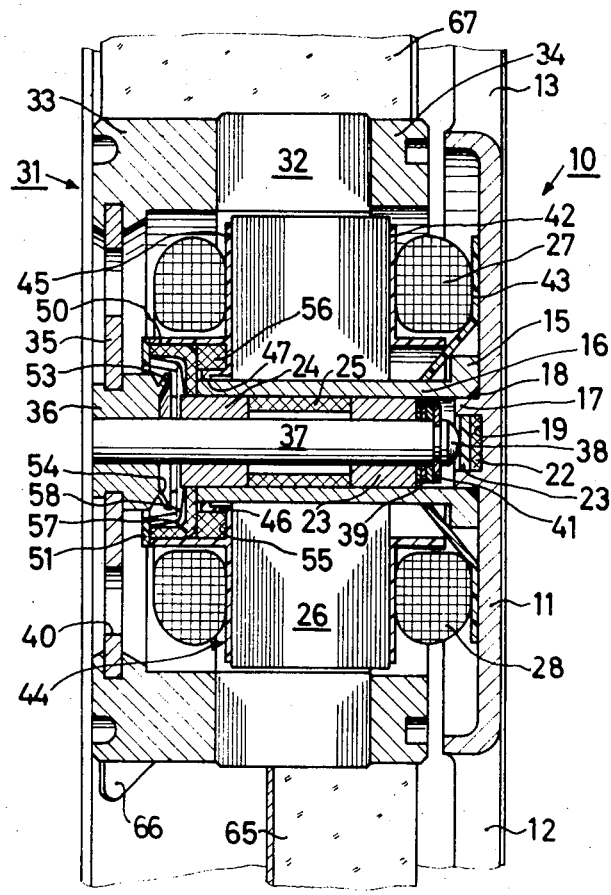
FIG. 1 illustrates a longitudinal cross-section of a motor of the external rotor type which serves to drive a ventilator and which is provided with a lubrication device in accordance with the present invention.

FIG. 1 illustrates in enlarged dimensions a longitudinal cross-section of a motor 10 of the external rotor type which is fixed onto a mounting plate 11. This mounting plate is connected with an outside housing (not shown) by means of several supporting arms, of which only supporting arms 12 and 13 are shown by way of example. In the middle of mounting plate 11 a flange 15 of a bearing support tube 16 is fixed by means of screws (not shown). In addition, a ring-shaped projection 17 is arranged in the middle of mounting plate 11, which serves to center bearing support tube 16. An O-ring 18, made of a suitable elastomer, is inserted in the manner shown in FIG. 1 between flange 15 and projection 17 and seals these two parts hermetically with respect to each other.

In depression 19, which lies within projection 17, are arranged one on top of the other a felt pad 22 soaked in lubricant and an artificial material member 23 with good bearing characteristics. In bearing support tube 16, separate from each other, are fixed two friction bearings 29 and 24 preferably made of a lubricant-soaked sintered material. Between bearings 29 and 24 lies a lubricant-soaked felt tube 25, which serves as lubricant reservoir for these two bearings.

On bearing support tube 16 a bank of stator laminations 26 is fixed, around which are two coils 27 and 28 (whose terminals are not shown in FIG. 1).

An external rotor designated in its entirety as 31 is so arranged that it can during operation rotate around the stationary stator lamination plates. The rotor has a number of (not shown) notches in which short circuit bars of aluminum are cast, which in turn are electrically and mechanically connected with cast short circuiting rings 33 and 34 of aluminum. The left-hand short circuiting ring 33 is connected to the external edge of a flat piece 35, which is provided with holes 40. The inner edge of flat piece 35 is fixed on a hub or bushing 36, which in turn is connected in a torsionally secure manner with an axle (or shaft) 37. Axle 37 is radially set in bearings 29 and 24. The right-hand end 38 of axle 37 is rounded and lies against bearing member 23, forming a first axial bearing. Furthermore, in a perforation at this right-hand end of axle 37 a spring ring 41 is fixed; between the spring ring and bearing 29 lie three plates designated as 39, of which that resting against the front side of bearing 29 forms with said bearing a second axial bearing. The two axial bearings hold external rotor 31 in a predetermined axial position relative to stator 26.

Between the right-hand front side of stator laminations 26 and coils 27 and 28 lies an insulating element 42, which is preferably a molded plate, and between mounting plate 11 and these coils lies an insulating element 43.

At the left front side of stator 26 is fixed an insulating element 44, for example by bonding with a suitable adhesive plastic material. The external portion of element 44 forms an insulating end part (or plate) 45, which lies between laminations 26 and coils 27 and 28. This end plate 45 extends almost to bearing support tube 16 and has on its inner edge a tube continuation 46 which encloses tube 16. Tube continuation 46 rests against bearing support tube 16 and acts as a sealer with a projection 47 which projects radially inward.

Element 44 further has a cylindrical surrounding part 50 which also could be designated as a ring collar and extends parallel to axle 37 and to the left of stator 26. The left-hand end of surrounding part 50 is fixed to the external side of a ring member (or plate) 51 in a liquid tight manner, so that this ring plate 51 forms a radially inward-extending member in the form of a shoulder. Ring 51 can, for example, be fixed by a suitable adhesive or by plastic heat sealing. It could also be elastically engaged in a nut at the inner circumference of surrounding portion 50.

The bushing 36 extends into the inside of surrounding part 50. Its right-hand end is formed as a centrifuging ring 53 which may also be termed a splash, spray, or deflecting ring. Ring 53 transports outwardly and throws off approximately radially, lubricant which travels from bearing 24, in the left-hand direction, along axle 37. Deflecting or centrifuging ring 53 has on its right-hand side a recess 54 in the general form of a truncated cone. Such a shape (form) works well and on its ground oil can gather in a certain operating position.

An annular felt ring 56 serving as a lubricant reservoir is set into the annular space 55 formed between surrounding part 50 and tube continuation 46. Ring 56 may be made of any other suitable material which absorbs the lubricant. Resting against left-hand front side of ring 56 is an absorbent body 57 which, in the present embodiment, is formed as an annular ring with an L-shaped cross-section and with its radially inwardly projecting portion bearing directly against bearing 24. A portion of absorbing body 57 lies around the centrifuging ring 53, and the free end of body 57 lies against the ring shoulder formed by ring part 51. To secure absorbing body 57 a spring action member 58 is provided, whose shape is more clearly set forth in FIGS. 2 and 3.

Figures 2, 3:
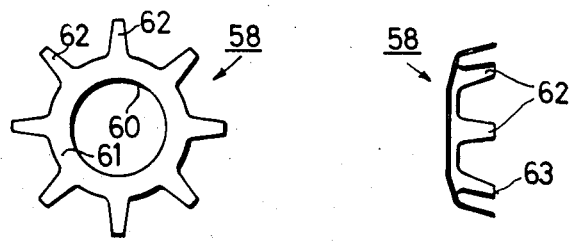
FIG. 2 is a topview of the blank for a spring utilized in the lubrication device described in FIG. 1.
FIG. 3 is a longitudinal cross-section of a spring utilized in the lubrication device described in FIG. 1, as it looks when ready to be installed.

FIG. 2 illustrates the blank of spring action member 58 directly after punching, thus in a still incomplete state, and FIG. 3 illustrates it in its bowed state ready for installation. In its middle it has an opening 60 whose diameter is somewhat greater than the external diameter of bearing 24. This opening 60 is surrounded by a middle part 61 from the external edge of which narrow tongues 62 extend and are bent at an angle away from middle part 61 (FIG. 3).

The mounting of absorbing body 57 is done in such a way that first, the felt ring 56 is set in the annular space 55. Then absorbing body 57 is set in, and finally spring action member 58 is pressed in, in such a way that it rests with its middle part 61 under pressure against the radially inward extending part of absorbing body 57 and presses the absorbing body against the surrounding part 50, while the tips (FIG. 3) of tongues 62 are braced against the ring shoulder formed by ring plate 51. In another embodiment it is also possible to fix ring plate 51 after the insertion of the spring action member 58. In accordance with the above-described mounting procedure, felt ring 56 and absorbing body 57 are filled to roughly 80 percent of their maximum absorbing volume with a lubricant, for example, silicon oil.

This filling must under normal conditions of use suffice for the entire life span of the motor, which can be exceptionally long. For example, if the motor is utilized in the manner described to drive a ventilator, of which in FIG. 1 three blades 65, 66 and 67 are illustrated, which are welded directly to the bundle of laminations 32 of rotor 31, the expected life span can be many tens of thousands of hours.

The motor described in FIG. 1 works as follows: in operation rotor 31 turns around stator laminations 26 which are fixed in place on bearing support tube 16, and thereby drives blades 65, 66 and 67. Axle 37 turns in bearings 29 and 24. Bearing 29 is in the inside of bearing support tube 16, which is hermetically sealed by O-ring 18, so that from it no lubricant can escape to the outside. However, lubricant can escape from bearing 24 along axle 37 to the left, and there arises the danger that this escaping lubricant might go along flat part 35 to holes 40 and into the cooling air stream of motor 10 and vaporize or get carried out in the airstream. This is prevented by centrifuging ring 53, which centrifuges the lubricant radially outward into absorbent body 57 set in the centrifuge portion of the device. Because spring action tongues 62 are formed so narrowly, the centrifuged lubricant is easily forced against the absorbent body 57, and by capillary action, passes back to felt ring 56 and to bearing 24. Body 57 is designed such that, during operation, lubricant passes therethrough by capillary action from the high pressure side thereof (left side) to the low pressure side. When the motor is inoperative, no substantial amount of lubricant leaks through body 57 since this body 57 is porous it will have an absorbent effect and thus act like a suction element. The ring shoulder formed by ring plate 51 also hinders in a very advantageous way the lubricant from getting on the outside of surrounding part 50, while projection 47 prevents lubricant from getting into the intervening space between bearing support tube 16 and stator laminations 26.

Figure 4:
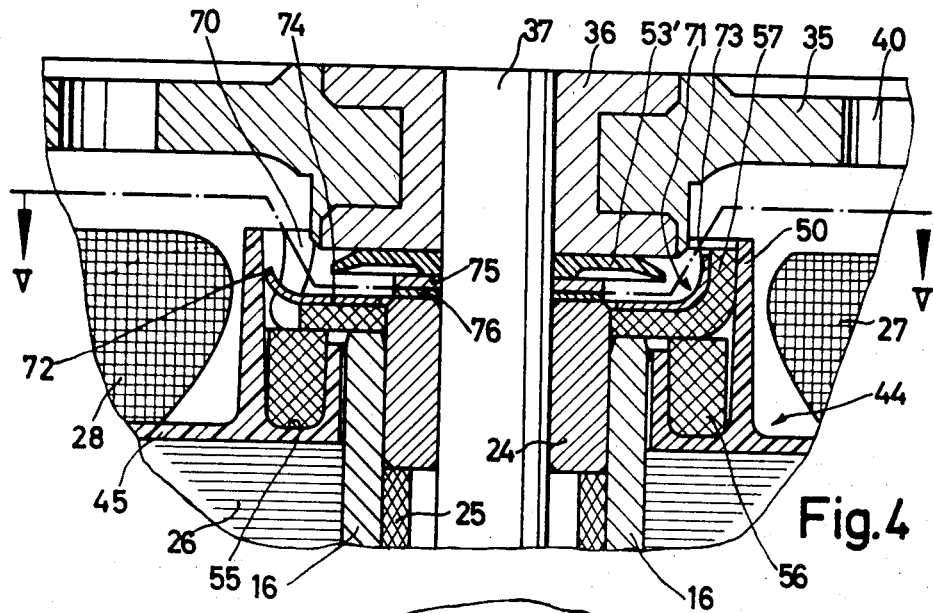
FIG. 4 is a longitudinal cross-section of a second embodiment of a lubrication device in accordance with the present invention.
Figure 5:
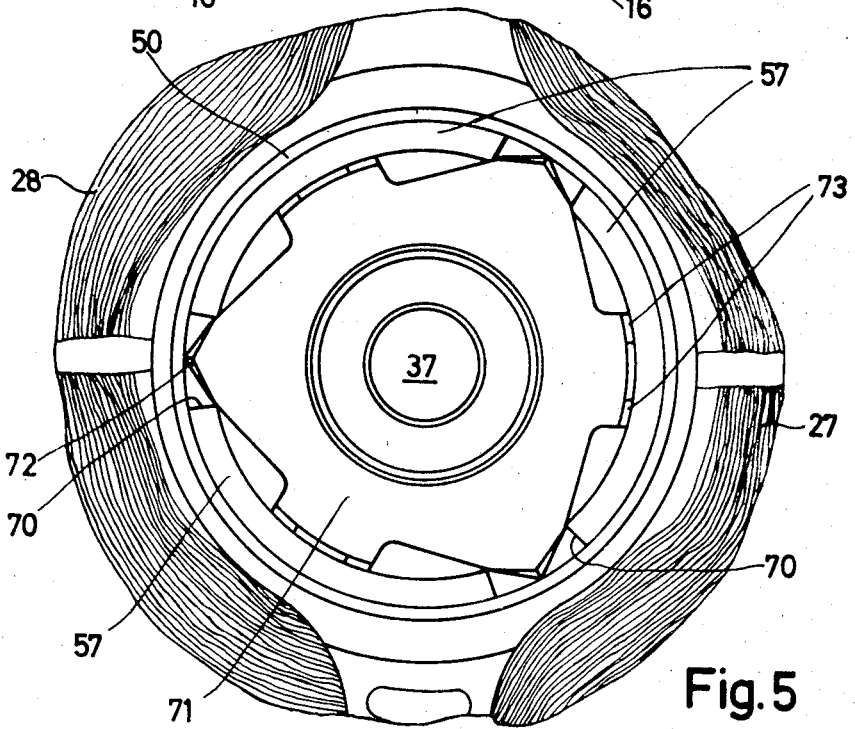
FIG. 5 is a section viewed along the line V—V of FIG. 4.

FIGS. 4 and 5 show a second embodiment of a lubrication device in accordance with the present invention. This embodiment is for a machine of the external rotor type which can be built substantially the same as the one in FIG. 1. Thus, only the parts relevant to the lubrication device are shown in FIGS. 4 and 5. Similar or analogous parts are designated with the same reference numerals as in FIG. 1 and not further described.

The annular felt ring 56 serving as a lubricant reservoir is arranged in the ring space 55 of element 44. Against it rests absorbing body 57, which has the same L-shaped cross-section as the one in FIG. 1; it also has three recesses 70 in its axially directed surrounding part (FIG. 5).

A spring action member 71, which has roughly the shape of an equilateral triangle, is provided with three pointed corners 72, which press into the material of surrounding part 50 when member 71 is pressed in.

Because of this, the ring plate 51 depicted in FIG. 1 is not necessary for certain operation-conditions whereby a simplification results.

At around 60° from the corners 72 are three narrow tongues 73 which, when spring action member 71 is forced or pressed into the surrounding part 50, are pressed against the outside parts of absorbing body 57 and thereby hold and fix these outside parts. At the same time, the middle part 74 of the spring action member 71 rests against the radially inwardly extending part of absorbing body 57 and holds the latter in contact with felt ring 56.

The centrifuging ring 53' is shown in this embodiment as a separate part 53'. Plate 53' can be made of a suitable material, such as plastic for example, and attached to socket 36. It can also, however, with advantage be formed as a part of bushing 36 just as in the arrangement shown in FIG. 1. Between centrifuging ring 53' and bearing 24 lies two sealing rings 75 and 76.

The lubrication device of FIGS. 4 and 5 works as follows:

From bearing 24 escaping oil, which during operation of the machine works its way under sealing plates 75 and 76, reaches centrifuging ring 53' and is centrifuged by the latter against absorbing body 57, by means of which the centrifuged (or thrown-out) lubricant is sent back to felt ring 56 and bearing 24 through capillary action. Thus, the lubricant moves continuously in a closed circuit and can never, for example, get as far as the openings 40 through which the cooling air enters, where it could be carried off by the cooling air and pulled into the inside of the cooling system.

Thus, by means of the described lubrication device, two important advantages arise: first, the lubricant is always sent back to the bearing, so that the latter has a very long life span and lubricant loss is very small; and second, only an extremely small quantity of lubricant is carried off by the cooling air of the motor into the surrounding system. This is especially important, if silicon-based lubricants are utilized, for even very small traces of this material will adversely affect the switching functions of low-voltage and current relays, especially by adversely affecting the contacts. This second deleterious effect is very strongly reduced by the present invention.

The present invention is in no manner limited to the two above examples of realization. Thus, the individual parts can be formed from other materials and may have other forms than those illustrated herein. Further utilizations, applications, modifications, and variants are possible to those skilled in the art without departing from the scope of the present inventive concepts as set forth in the claims.

We claim:

1. In an external rotor motor having a bearing (24) and a rotating part (37) journalled in the bearing,
  a lubricating device for the lubrication of the bearing and of the rotating part (37) comprising
  a lubricant reservoir (55) retaining a lubricant supply;
  a rotating centrifuging ring (53) for centrifuging lubricants escaping along said rotating part (37);
  an absorbant body (57) located in communication with said lubricant reservoir (55) and said bearing (24) and located to receive centrifuged lubricants from said centrifuging ring (53);
  a housing (44) for said lubrication device having a surrounding part (50) which surrounds said centrifuging ring (53) and at least a portion of said rotating part, said absorbent body (57) being located at least partially within said surrounding part (50);
  and an insulating end element (45) arranged against one side of the stator laminations (26) of said motor, said end element (45) comprising at least a part of said housing (44) and closing said surrounding part (50) on its side facing the stator lamination.

2. In an external rotor motor according to claim 1 wherein said centrifuging ring (53) extends in an inclined direction relative to the axial direction of said rotating part (37) and is coaxial with said rotating part (37).

3. In an external rotor motor according to claim 1 wherein said lubricating device housing (44) further includes means forming an annular recess (55) surrounding said rotating part (37) and which forms at least a portion of said lubricant reservoir.

4. In an external rotor motor according to claim 3 wherein said lubricant reservoir comprises an annular absorbent member (56) in said recess.

5. In an external rotor motor according to claim 1 wherein said surrounding part (50) is provided with a radially inwardly projecting part (51).

6. In an external rotor motor according to claim 5 wherein said projecting part (51) is formed as an annular plate which is connected liquid-tight with said surrounding part (50).

7. In an external rotor motor according to claim 1 wherein said lubricating device housing (44) is formed of plastic material.

8. In an external rotor motor according to claim 1 comprising a spring action member (58) fixedly securing said absorbent body (57) with said surrounding part (50).

9. In an external rotor motor according to claim 8 wherein said spring action member (58) has a middle portion (61) having an opening (60) therein and a plurality of spring action tongues (62) extending from said middle portion (61); and said absorbent body (57) has a radially inwardly extending portion, at least a part of the spring action member (58) resting under pressure against said radially inwardly extending portion of said absorbent body (57).

10. In an external rotor motor according to claim 9 wherein said middle portion (61) of the spring action member (58) rests under pressure against said radially inward extending portion of said absorbent body (57).

11. In an external rotor motor according to claim 9 wherein said absorbent body (57) is formed as an annular member having a substantially L-shaped cross-section.

12. In an external rotor motor according to claim 9 wherein said absorbent body (57) is formed as an annular member having a substantially L-shaped cross-section, said absorbent body (57) having a recess (70) in its circumference part, a tongue (62) of said spring action member (58) extending through said recess (70) and resting directly against said surrounding part (50).

13. In an external rotor motor according to claim 9 wherein said surrounding part (50) is provided with a radially inwardly projecting part (51) and wherein the tip (63) of at least one of said spring action tongues (62) rests against said radially inwardly projecting part (51).

14. In an external rotor motor according to claim 1 wherein the motor has an external housing member (35); and wherein said rotating part (37) comprises the motor shaft;
  a bushing (36) on said shaft (37) and securing the shaft in said external housing; said bushing (36) carrying said centrifuging ring (53).

15. Lubrication device according to claim 14, wherein said centrifuging ring (53) is formed as a part of said bushing (36).

16. In an external rotor motor according to claim 1 wherein the combined lubricant capacity of said absorbent body (57) and of said lubricant reservoir (55) is greater than the amount of lubricant carried therein.

17. In an external rotor motor according to claim 1 comprising means (56) for absorbing lubricant located in said lubricant reservoir (55).

18. In an external rotor motor according to claim 1 comprising sealing means (47) to close said lubricant reservoir (55).

19. Lubrication device for an electric fractional horsepower motor comprising:
  a stator (26);
  a shaft (37) rotatably mounted inside said stator (36);
  a bearing (24) within which said shaft rotates;
  a rotor (32) fixed to said shaft (37), said rotor (32) being rotatable around the outside of the stator (26);
  a lubricant reservoir (55) retaining a lubricant supply and located in communication with said bearing (24);
  a centrifuging ring (53) for centrifuging lubricants escaping from along said shaft (37);
  an absorbent body (57) located in communication with said lubricant reservoir and located to receive centrifuged lubricants from said centrifuging ring (53);
  a housing member (44) for said lubricating device fixed to the stator (26) and having a surrounding part (50) connected thereto in a liquid-tight manner for supporting said absorbent body (57), said surrounding part (50) extending substantially in parallel to said shaft (37) and being closed on its side facing the stator (26); and
  a spring action member (58) for securing said absorbent body (57) within said surrounding part (50).

20. Lubrication device according to claim 19 wherein said housing member (44) further includes means forming an annular recess (55) surrounding said shaft (37) and which forms at least a portion of said lubricant reservoir.

21. Lubrication device according to claim 19 comprising an isolating end part (45) arranged against one front side of the stator laminations of said motor, said end part (45) comprising at least a part of said member (44) and closing said surrounding part (50) on its side facing the stator.

22. Lubrication device according to claim 19 wherein said surrounding part (50) is provided with a radially inwardly projecting part (51).

23. Lubrication device according to claim 22 wherein said projecting part (51) is an annular ring plate which is connected liquid-tight with said surrounding part (50) and extends radially and inwardly from said surrounding part (50).

24. Lubrication device according to claim 19 wherein said spring action member (58) has a middle portion (61) having an opening (60) therein and a plurality of spring action tongues (62) extending from said middle portion (61); and said absorbent body (57) has a radially inwardly extending portion, at least a part of the spring action member (58) resting under pressure against said radially inward extending portion of said absorbent body (57).

25. Lubrication device according to claim 24 wherein said surrounding part (50) is provided with a radially inwardly projecting member (51) and wherein the tip of at least one tongue (62) of said spring action member (58) rests against said radially inwardly projecting member (51).

26. Lubrication device according to claim 19, further comprising a rotating bushing (36) secured to said shaft (37), the centrifuging ring (53) being formed as part of the bushing (36).

* * * * *